United States Patent Office  3,257,311
Patented June 21, 1966

3,257,311
CONTINUOUS SELECTIVE CONVERSION OF HYDROCARBONS WITH A CRYSTALLINE ZEOLITE HAVING A SILICON TO ALUMINUM RATIO OF AT LEAST 1.8
Vincent J. Frilette, Cherry Hill Township, Camden County, N.J., and Paul B. Weisz, Media, Pa., assignors to Socony Mobil Oil Company, Inc., a corporation of New York
No Drawing. Filed July 6, 1964, Ser. No. 380,675
The portion of the term of the patent subsequent to July 7, 1981, has been disclaimed
9 Claims. (Cl. 208—120)

In copending application, Serial No. 754,915, filed August 14, 1958, now U.S. Patent No. 3,140,322, of which this application is a continuation in part, there is disclosed and claimed selective catalytic conversion processes utilizing crystalline solids which have had added catalytic activity located within the pores of said solids. Suprisingly, it has been found that certain crystalline solids possess inherent catalytic activity thereby rendering them useful in their natural or synthesized state without the necessity of imparting added catalytic activity.

This invention relates to a novel method for conducting catalytic conversion processes with specific and unusual selectivity towards certain reaction paths, and for reacting certain specific compounds from a mixture of reactants. More particularly, the present invention is directed to a method for selectively conducting chemical reactions in the presence of crystalline solids having both (a) rigid three-dimensional networks with interstitial dimension such that only reactant or product molecules of suitable size and shape may be transported in either direction between the exterior phase and the interior thereof, (b) pore sizes of about 5 Angstrom units, and (c) having associated therewith cations consisting of sodium, calcium and mixtures thereof.

In particular, the method described herein is concerned with catalytic processing operations carried out in the presence of a solid, crystalline, zeolitic structure of very well defined intra-crystalline dimensions, which has the ability by reason of its intra-crystalline dimensions to allow the passage into or out of its crystalline cavities of only certain molecules, that is, of molecules having particular shape or size. Such zeolites wherein only molecules of particular size and shape are able to enter are sometimes known as molecular filters or molecular sieves.

In accordance with the method of the invention, catalytic selectivity is achieved by establishing catalytic reaction systems utilizing substances which act as molecular sieves, and in which the sieve dimensions are in such relation to the chemical species involved in catalytic reaction that only selected species are allowed to pass the sieve structure.

Adsorbents which behave as molecular sieves have heretofore been utilized for effecting physical separation of mixtures of materials of varying molecular size. Such substances have been described by Barrer in several publications and in U.S. 2,306,610 and U.S. 2,413,134. Thus, molecular sieves are essentially the dehydrated forms of crystalline natural or synthetic hydrous siliceous zeolites containing varying quantities of sodium, calcium, and aluminum with or without other metals. All or a portion of the sodium or calcium ions normally contained in the molecular sieve structure may be zeolitically replaced with a number of various other ions. The atoms of sodium, calcium or metals in replacement thereof, silicon, aluminum and oxygen in these zeolites are arranged, in the form of an aluminosilicate salt in a definite and consistent crystalline pattern. This structure contains a large number of small cavities, interconnected by a number of still smaller holes or channels. These cavities and channels are precisely uniform in size.

The instant invention is concerned with utilizing the crystalline structure of certain specific aluminosilicates for conducting conversion processes with specific selectivity toward certain reaction paths and at relatively good activities.

The crystalline solids which are operable in the novel process of this invention are crystalline aluminosilicates having from 0.5 to 1.0 equivalent of metal cations per gram atom of aluminum. The aluminosilicate can be described as a three-dimensional framework of $SiO_4$ and $AlO_4$ tetrahedra in which the tetrahedra are cross-linked by the sharing of oxygen atoms, whereby the ratio of total aluminum and silicon atoms to oxygen atoms is 1 to 2. In their hydrated form the aluminosilicates may be represented by the formula:

$$M_{2/n}O:Al_2O_3:wSiO_2:yH_2O$$

wherein M represents cations selected from the group consisting of sodium ions, calcium ions, and mixtures thereof; $n$ represents the valence of the cation; $w$ the moles of $SiO_2$; and $y$ the moles of $H_2O$.

Aluminosilicates falling within the above formula are well known in the art and include a wide variety of materials, both natural and synthetic. Typical aluminosilicates which are useful for the novel process of this invention would include natural materials such as stilbite, offretite, chabazite, gmelinite, levynite, analcite, mordenite, and clinoptilolite, as well as synthetic Zeolite A. Of these materials, the natural alumino silicates are preferred because of their availability and relative ease of recovery from the ground.

There are two types of selective catalytic processing operations which can be accomplished by application of the principles of this invention; it will be helpful to characterize these broadly, and to subsequently illustrate them by examples:

(1) In a reactant mixture containing the materials A, B, and c which would normally react catalytically to give the respective products A', B', and c', it is possible to selectively provide reactivity only for the reaction c→c' by using an aluminosilicate having openings of a size which will allow c and c' to pass, but will not be penetrable by A and B.

This type of system will be referred to as the reactant-selective system. It is illustrated by writing the set of possible catalytic reactions which would normally be capable of proceeding, but wherein only one specific reactant, as well as its reaction product c' is capable of passing to and from the solid particle; which is indicated by the use of the lower case letter c in contrast to capital letters for the species which are too large to pass as indicated by the following:

(Type I)

The net reaction which will selectively proceed is indicated by the box. In principle, of course, there may be any number of possible simultaneous reactions, as well as the ability to select more than one specific net reaction.

(2) In a process which normally transforms a species. a into alternate products, b, C, D, etc., the reaction to form only, say b, may be catalyzed wherein a and b molecules are of a size smaller than C and D and the catalyst base filter-dimension is chosen to pass only a and b.

This type of a reaction system will be referred to as the product seelctive system. It is best illustrated by one or both of the following sets of reaction schemes:

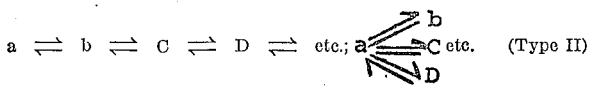   (Type II)

Again, molecular species are indicated in the lower case when they are small enough to pass the structure, or as capital letters when they are not.

This embodiment of the invention is based on the very important recognition that some of the reaction products, like C and D, can be produced within the crystal chamber, until their concentration approaches their thermodynamic equilibrium value within the chambers, but that nevertheless no net production rate, as regards the external user, will or can proceed because of size restriction.

It is to be understood that although reference has been made to aluminosilicates having a pore size of about 5 Angstrom units and having associated therewith ions selected from the group consisting of calcium, sodium, or mixtures thereof, it is intended to include other materials which have an analogous structure to aluminosilicates resulting from iosomorphous substitution of some or all of the atoms of aluminum or silicon with other elements, e.g., substitution of germanium for silicon and/or gallium for aluminum.

As has heretofore been pointed out, the aluminosilicate compositions employed in the novel process of this invention contain from 0.5 to 1.0, and more preferably from 0.8 to 1.0, equivalent per gram atom of aluminum of metal cations selected from the group consisting of calcium, sodium and mixtures thereof, and have a pore size of about 5 Angstrom units. While the aluminosilicate may contain varying amounts of silicon and aluminum, it has been found that good results can be achieved through the use of crystalline aluminosilicates having atomic ratios of silicon to aluminum which are preferably at least 1.8 and more preferably at least about 2.8.

Although it is preferred to use the aluminosilicate catalyst per se it is to be understood that this invention includes incorporation of the aluminosilicate catalyst with a porous matrix, either organic and/or inorganic, with which the aluminosilicate can be combined, dispersed, or otherwise intimately admixed, wherein the matrix may be active or inactive. Representative matrices which can be employed would include metals and alloys thereof, sintered metals and sintered glass, asbestos, silicon, carbide aggregates, pumice, firebrick, diatomaceous earth, activated charcoals, refractory oxides, organic resins such as polyepoxides, polyamines, polyesters, vinyl resins, phenolics, amino resins, melamines, acrylics, alkyds, epoxy resins and inorganic oxides such as silica, alumina, or combinations thereof. Catalysts may be used in a powdered, granular or molded form or formed into spheres, pellets or finely divided particles having a particles size of 500 mesh or larger (Tyler).

The aluminosilicates catalysts, either alone or admixed with a porous matrix, is preferably precalcined in an inert atmosphere near or above the temperature contemplated for conversion, but may be calcined initially during use in the conversion process. Generally the aluminosilicate is dried between about 150° F. and 500° F. and thereafter calcined in air or an inert atmosphere of nitrogen, hydrogen, helium, flue gas or other inert gases, at temperatures ranging from 400° F. to 1500° F. for periods of time ranging from about 1 to 48 hours or more.

The aluminosilicate compositions described herein are effective catalysts for a wide variety of chemical reactions wherein the differentiation between linear aliphatic molecules such as normal olefins and normal paraffins from all other molecules such as aromatic isoparaffins, isoolefins, whose cyclic structures is desired. As is known, aluminosilicates having a pore size of about 5 Angstrom units have the ability to selectively differentiate the normal aliphatic molecules from all others. This property will serve to more specifically define the meaning of the terminology . . . about 5 Angstrom units . . . as used in this description. The invention utilizes this inherent property of aluminosilicates having the necessary pore size and combines it with the surprising activity of these materials for particular conversions. Therefore, in accordance with this invention it is possible, for example, to crack a normal aliphatic hydrocarbon such as hexane, and obtain cracked products substantially free from isomeric components. Similarly, in accordance with the instant invention, it is possible to hydrate olefins, aminate olefins, dehydrate alcohols, produce esters, hydrolyze esters, desulfurize hydrocarbons to the substantial exclusion of the formation of products other than those having linear aliphatic molecules. Additionally, in accordance with the instant invention, it is also possible to selectively react one component in a feed stream to the substantial exclusion of the other. Thus, for example, it is possible to selectively crack a normal, aliphatic hydrocarbon, e.g., hexane from a mixture of said normal hydrocarbon, with compounds other than linear aliphatic compounds such as iso-aliphatic hydrocarbons, naphthenic hydrocarbons and aromatic hydrocarbons.

The novel process of this invention can be carried out in a bath, semi-continuous or continuous manner, although continuous operation is preferred.

The following examples will illustrate the best mode now contemplated for carrying out the invention.

EXAMPLE 1

Gmelinite, a naturally occurring aluminosilicate was ground to a particle size of about 5 microns, then evaluated for cracking normal hexane. The procedure employed involved passing a helium stream carrying normal hexane vapor at a flow rate of 10 cubic centimeters per minute over a 1.5 cubic centimeter bed of catalyst and measuring the conversion at selected time intervals. The results obtained showed a 7% conversion of n-hexane even after 10 minutes on stream at a temperature of 1000° F.

EXAMPLE 2

The procedure of Example 1 was repeated with the exception that chabazite was employed as the catalyst. Analysis indicated 6.4% conversion after 10 minutes on stream at 1000° F.

EXAMPLE 3

The procedure of Example 1 was repeated with the exception that the aluminosilicate employed was a naturally occurring crystalline aluminosilicate identified as erionite. Analysis indicated a 10.8 percent conversion after five minutes on stream at 1000° F. and a 7.9 percent conversion after 26 minutes on stream at 1000° F.

EXAMPLE 4

The procedure of Example 1 was repeated with the exception that the aluminosilicate employed was a synthetic crystalline aluminosilicate identified as Zeolite 5A, and the flow rate of the helium stream carrying the n-hexane vapor was 10 cubic centimeters per minute over a cubic centimeter bed of the crystalline synthetic zeolite. Analysis indicated a 7.3 percent conversion of n-hexane after 10 minutes on stream at 1000° F.

EXAMPLE 5

Chabazite, a naturally occurring aluminosilicate is ground to a particle size of about 5 microns and then is evaluated for cracking 2-methylpentane. The procedure involves passing a helium stream containing 2-methylpentane vapor at a flow rate of 10 cubic centimeters per minute over a 1.5 cubic centimeter bed of catalyst and measuring the conversion at selected intervals. Analysis by conventional methods indicates that substantially no 2-methylpentane is converted at a temperature of 1000° F.

EXAMPLE 6

The procedure of Example 5 is repeated with the exception that the aluminosilicate employed is erionite. Analysis indicates that no 2-methylpentane is converted, thereby demonstrating the shape selectivity of the compositions utilized in the invention, i.e., because of their limited pore size of about 5 Angstrom units, they will selectively exclude compounds other than those having a linear aliphatic structure

EXAMPLE 7

Chabazite, a naturally occurring aluminosilicate, is ground to a particle size of about 5 microns and then contacted with a helium stream containing a mixture of n-hexane and 2-methylpentane by flowing the same over a 1.5 cubic centimeter bed of catalyst and measuring the conversion at selected time intervals. Analysis indicates a conversion of n-hexane of 7 percent after 10 minutes on stream at a temperature of 1000° F. and no conversion of the 2-methylpentane.

EXAMPLE 8

This example illustrates a further embodiment of the present invention in a reactant selective catalytic conversion process. It deals with the selective catalytic cracking of normal paraffins in contrast to that of iso-paraffins. Normally, cracking rates of iso-paraffins are comparable, and can even be greater than those obtained with normal paraffins. However, this invention affords a distinct selectivity to the cracking of the normal paraffins.

The sample reaction used in this example is illustrated by:

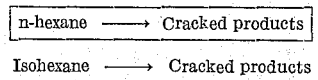

Isohexane ⟶ Cracked products

The cracking conversion of n-hexane was compared with that of 3-methylpentane, over both conventional catalyst of 46 activity index silica-alumina catalyst (containing 10 weight percent $Al_2O_3$ and 90 weight percent $SiO_2$), and over the "5A" molecular filter type zeolite. A conventional atmospheric pressure reactor was used, operating at 930° F., at 1 LHSV, and the results are summarized below:

| Catalyst | Conversion percent | |
|---|---|---|
| | n-Hexane | 3-methyl-pentane |
| Silica Alumina | 10.7 | 22.7 |
| 5A Molecular Sieve | 10.2 | 1.0 |

It will be noted that an essentially complete catalytic differentiation is made for the two reactants.

EXAMPLE 9

This example extends the results demonstrated in Example 8 to show the selective cracking activity on a normal paraffin which is obtainable when a complex mixture of hydrocarbons is charged to such a cracking process. A charge stock containing seven hydrocarbon components was charged over 5A zeolite as catalyst at 1000° F. and .5 LHSV in a glass reactor of standard design, at atmospheric pressure. The remaining concentration of each component was then measured, and compared with the charge stock composition. A run with inert Vycor chips replacing the catalyst was also made to establish the magnitude of conversion ascribable to thermal i.e., non-catalytic reactions. The results are listed below:

| | Charge Stock (g./100 g. Charge) | Reaction Products With 5A Molecular Sieve (g./100 g. Charge) | Reaction Products With Vycor Chips (g./100 g. Charge) |
|---|---|---|---|
| n-Hexane | 27.1 | 15.4 | 28.1 |
| 2-methylpentane | 26.7 | 26.6 | 29.5 |
| 3-methylpentane | 18.9 | 21.3 | 23.9 |
| 2,2-dimethyl butane | 3.7 | 3.5 | 2.9 |
| 2,3-dimethyl butane | 5.2 | 4.5 | 4.6 |
| Methyl cyclopentane | 5.6 | 3.9 | 4.5 |
| Cyclohexane | 0.1 | 0.1 | 0.1 |
| Benzene | 6.6 | 5.2 | 5.4 |

The selective cracking of n-hexane over the 5A Molecular Sieve is clearly seen. The small changes in the concentration values of some of the minor components are consistent with a small background of thermal reaction, and with the finite errors of analysis inherent in a study of a complex hydrocarbon mixture.

EXAMPLE 10

This example deals with the cracking of a paraffin with product-selectivity toward only normal molecular product structures. When a normal paraffin undergoes cracking within the "A"-type zeolite crystal, again only normal paraffinic or olefinic products are capable of escaping the structure. The A-type crystal, having channel dimensions of about 5 Angstrom units, can accordingly be used to crack paraffin hydrocarbons with the result that only normal cracked products are obtained. This is strikingly demonstrated by an analysis, by vapor chromatography, of the gases from a run in which n-hexane was cracked over 5A zeolite, as reported above in Example 8, with a resulting conversion of 10.2 percent of the hexane. The concentrations of the gaseous components observed are reported below:

$C_3$ CRACKING—GAS COMPOSITIONS

| | |
|---|---|
| Catalyst | 5A |
| Charge | n-$C_6$ |
| Temp. (° F.) | 930 |
| LHSV | 1.0 |
| Isobutenes | 0.8 |
| Normal butenes | 7.1 |
| Isobutane | 0 |
| Normal butane | 1.2 |
| Isobutane | 0 |
| Normal pentane | 11.4 |
| Pentenes | 0 |

It will be seen from the foregoing that the normal $C_4$ and $C_5$ cracked products were, in each instance, selectively obtained over the corresponding iso compounds.

Examples 11 and 12 will further illustrate the application of the teachings of this invention in continuous catalytic conversions. One of the advantages and distinctions of a size or shape selective catalytic process over a size selective sorption process is that the catalytic process can handle in one continuous step more feed material than the sorption process which is naturally limited by the sorption capacity of the alumino-silicate.

In the following examples, catalytic processes were carried out and the amount of product obtained per gram of catalyst was measured and compared with the amount of sorption under the same conditions. In all cases, the amount of material processed in the catalytic method was greater than that obtainable by a simple sorption process.

EXAMPLE 11

Cracking of n-paraffin waxes

One hundred fifty cubic centimeters per minute of helium carrier gas saturated with n-docosane (n—$C_{22}H_{46}$) vapor at about 450° F. was passed through a catalyst bed consisting of 20 milliliters (14.3 grams) of a synthetic crystalline aluminosilicate identified as 5A at a temperature of 1000° F., a LSHV of about 0.1 and an apparant residence time of about 3 seconds. Four consecutive runs, each one hour in duration, were made before the catalyst was regenerated. The results are shown in the following table:

TABLE

|  | Run Number | | | |
| --- | --- | --- | --- | --- |
|  | 1 | 2 | 3 | 4 |
| On Stream Time, hr | 1 | 2 | 3 | 4 |
| Total Feed Rate, gm./hr | 1.64 | 1.70 | 1.70 | 1.48 |
| Conversion, percent | 87.6 | 81.2 | 65.9 | 55.4 |
| Grams of product per gm. catalyst | 0.10 | 0.20 | 0.28 | 0.34 |
| Maximum liquid hydrocarbon sorption capacity, gm./gm. of sorbant | 0.06 | 0.06 | 0.06 | 0.06 |

EXAMPLE 12

The process of Example 2 was repeated with the execption that 50 ml. (27.7 grams) of 5A were used. The results are shown below:

Table

|  | Run Number | |
| --- | --- | --- |
|  | 1 | 2 |
| On Stream Time, hr | 1 | 2 |
| LHSV | 0.31 | 0.21 |
| Conversion, percent ($C_1$-$C_{20}$) | 49.8 | 38.0 |
| Grams of product per gram of catalyst | 0.15 | 0.28 |
| Maximum liquid hydrocarbon sorption capacity, gm./gm. of sorbant | 0.06 | 0.06 |

What is claimed is:

1. A process for selectively conducting a chemical reaction which comprises bringing a mixture of reactants consisting of components of different molecular configurations, of which at least one has a linear aliphatic structure, into contact with a crystalline aluminosilicate having a silicon to aluminum ratio of at least 1.8 and a pore size of about 5 Angstrom units and containing from 0.5 to 1.0 equivalent per gram atom of aluminum, of ions of positive valence selected from the group consisting of sodium, calcium and mixtures thereof.

2. The process of claim 1 wherein the aluminosilicate has a silicon to aluminum ratio of at least 2.8.

3. A continuous method for selectively cracking n-aliphatic hydrocarbons from a mixture of the same with at least one other hydrocarbon selected from the group consisting of isoaliphatic hydrocarbons, naphthenic hydrocarbons and aromatic hydrocarbons which comprises bringing said mixture at catalytic cracking conditions in contact with a crystalline aluminosilicate having a silicon to aluminum ratio of at least 1.8 and a pore size of about 5 Angstrom units, and containing from 5.0 to 1.0 equivalent per gram atom of aluminum of ions of positive valence selected from the group consisting of sodium, calcium and mixtures thereof, wherein the n-aliphatic hydrocarbon component is admitted into the interior of said aluminosilicate to the exclusion of the other hydrocarbon components and removing the resulting products of cracking said n-aliphatic hydrocarbon component from said aluminosilicate.

4. The method of claim 3 wherein the aluminosilicate is chabazite.

5. The method of cliam 3 wherein the aluminosilicate is stilbite.

6. The method of claim 3 wherein the aluminosilicate is gmelinite.

7. The method of claim 3 wherein the aluminosilicate is offretite.

8. The method of claim 3 wherein the aluminosilicate is erionite.

9. The method of claim 3 wherein the aluminosilicate is dispersed with a porous matrix.

References Cited by the Examiner

UNITED STATES PATENTS

| 2,962,435 | 11/1960 | Fleck et al. | 208—120 |
| 3,039,953 | 6/1962 | Eng | 208—26 |
| 3,140,251 | 7/1964 | Plank et al. | 208—120 |
| 3,140,322 | 7/1964 | Frilette et al. | 208—120 |

DELBERT E. GANTZ, *Primary Examiner.*

ALPHONSO D. SULLIVAN, *Examiner.*

A. RIMENS, *Assistant Examiner.*

UNITED STATES PATENT OFFICE
CERTIFICATE OF CORRECTION

Patent No. 3,257,311                  June 21, 1966

Vincent J. Frilette et al.

It is hereby certified that error appears in the above numbered patent requiring correction and that the said Letters Patent should read as corrected below.

Column 8, lines 16 and 17, for "5.0 to 1.0 equivalent" read -- 0.5 to 1.0 equivalent --.

Signed and sealed this 10th day of October 1967.

(SEAL)
Attest:

Edward M. Fletcher, Jr.

Attesting Officer

EDWARD J. BRENNER

Commissioner of Patents